United States Patent
Nuss

(10) Patent No.: US 6,546,963 B2
(45) Date of Patent: Apr. 15, 2003

(54) FIRE RESISTANT PIPING SYSTEM

(75) Inventor: W. Philip Nuss, Covington, LA (US)

(73) Assignee: Halter Marine, Inc., Gulfport, MS (US)

( * ) Notice: Subject to any disclaimer, the term of this patent is extended or adjusted under 35 U.S.C. 154(b) by 0 days.

(21) Appl. No.: 09/733,126

(22) Filed: Dec. 8, 2000

(65) Prior Publication Data

US 2002/0069924 A1 Jun. 13, 2002

(51) Int. Cl.[7] .................................................. F16L 11/04

(52) U.S. Cl. ........................ 138/141; 138/143; 138/133; 138/138

(58) Field of Search ................................ 138/143, 140, 138/141, 137, 138, 139, 132, 133

(56) References Cited

U.S. PATENT DOCUMENTS

| | | | | |
|---|---|---|---|---|
| 4,216,802 A | * | 8/1980 | Bonnes et al. | 138/143 |
| 4,559,973 A | * | 12/1985 | Hane et al. | 138/138 |
| 5,671,780 A | * | 9/1997 | Kertesz | 138/143 X |
| 5,769,128 A | * | 6/1998 | Auvil et al. | 138/143 |
| 5,775,378 A | * | 7/1998 | Auvil et al. | 138/143 |
| 5,972,450 A | * | 10/1999 | Hsich et al. | 138/143 X |
| 6,000,436 A | * | 12/1999 | Auvil et al. | 138/143 |
| 6,009,912 A | * | 1/2000 | Andre | 138/143 |
| 6,293,311 B1 | * | 9/2001 | Bushi et al. | 138/138 |

* cited by examiner

Primary Examiner—Patrick Brinson
(74) Attorney, Agent, or Firm—Len R. Brignac

(57) ABSTRACT

A ship including a multi-layer composite piping system formed from a laminated pipe structure comprising: (a) a metal tube; (b) a bonding layer disposed on both sides of the metal tube; and (c) an internally cross-linked polymer layer disposed on both bonding layers.

4 Claims, 2 Drawing Sheets

FIRE RESISTANT PIPING SYSTEM

SPECIFICATION

This invention relates to a piping system, which has increased, fire resistance compared with available potable and non-potable water piping systems. The inventions relates to the use of a unique laminated piping structure which has a metal core of aluminum and a polymer coating bonded to the metal core so that when the pipes heat to a high temperature, due to shipboard fire, the system does not entirely ignite, and the piping system is safer for the crew of the ship. Additionally, a long need has existed for a pipe which avoids corrosion, having a smooth surface and a diffusion tightness approaching 100%, and ability for linear expansion which can be as low as that of copper, enabling larger fixing distances. A piping system has been long desired which would meet the A-18 marine type approval under IMO resolution A-653 (16) and Resolution MSC 41(64).

BACKGROUND OF THE INVENTION

Potable and non-potable piping systems, such as those used for water ballast have been prepared using metal pipes, which are traditionally expensive. Certain polymer pipes have been refused by the Coast Guard regulations due to their fundamental instability at high temperatures, such as at incendiary temperatures. Other pipes, such as PEX, and PVC along have been insufficient because the heat of expansion of the pipe is very high. For example, a plain polypropylene pipe is 100 times the heat of expansion at 500K than copper is. Copper is approximately twice that of galvanized steel.

It has been difficult to acquire and install lighter piping systems than the traditional galvanized steel systems and copper because of the problems with heat of expansion and with flame resistance and accordingly the installation of piping on board ship has been expensive due to the weight and the talent involved in welding the pipe together.

For this reason, it is advantageous to utilize a laminated pipe systems which is lighter than traditional metal pipes and easier to use than concrete pipes yet still have fire resistant functionality.

SUMMARY OF THE INVENTION

Accordingly, it is an object of this invention to provide a ship with a pipe system made from multi-layer pipe, which is flexible and lighter than traditional metal piping system. The present invention is designed to utilize a flexible pipe system which can be bent by hand yet keep its shape, eliminating the need to form pieces such as elbows and bends.

A ship including a multi-layer composite piping system formed from a laminated pipe structure comprising: (a) a metal tube; (b) a bonding layer disposed on both sides of the metal tube; and (c) an internally cross-inked polymer layer disposed on both bonding layers.

Another object of this invention is to provide a piping system, which has fire resistant functionality utilizing a metal and polymer/copolymer laminate structure.

DETAILED DESCRIPTION

Figure 1:
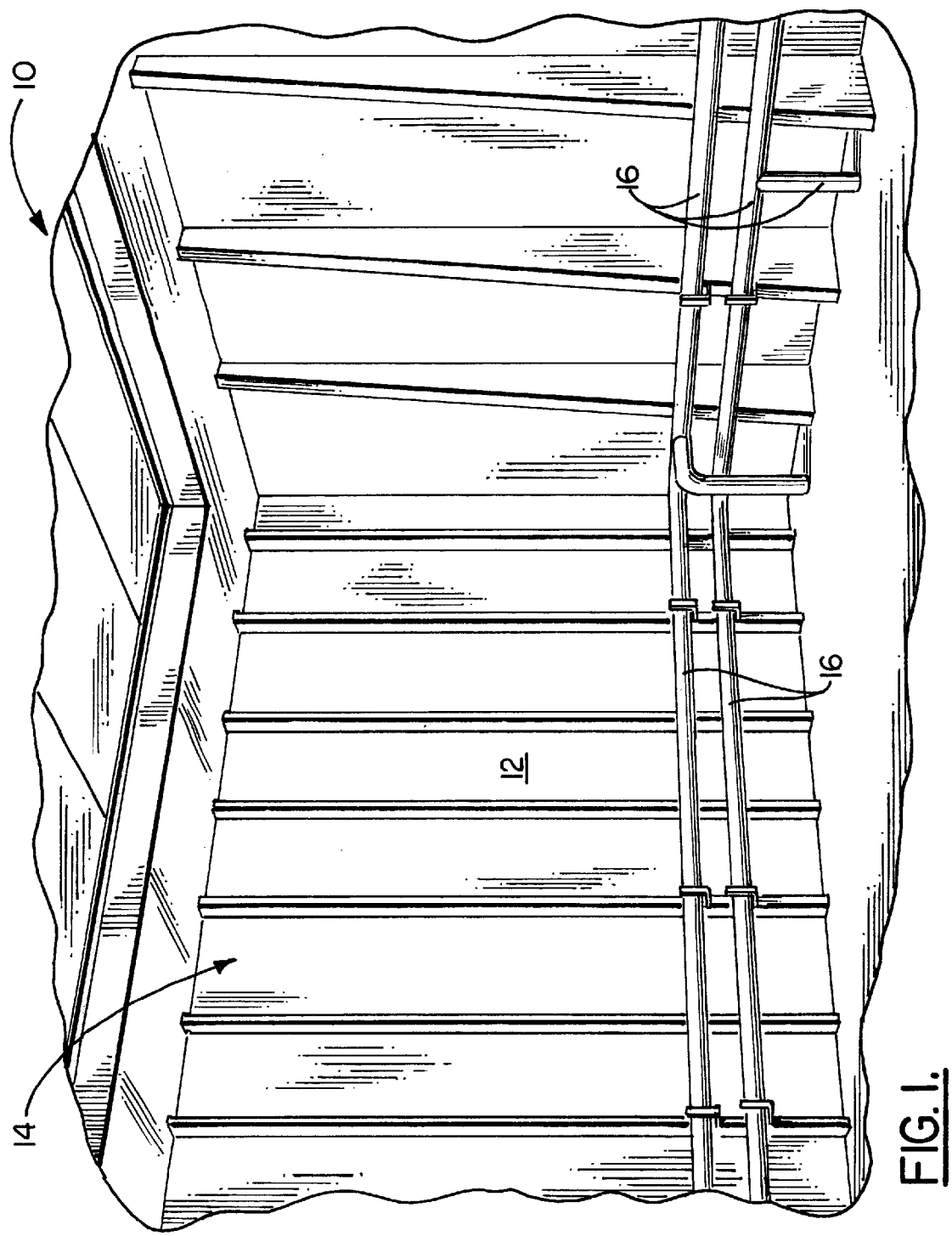
FIG. 1 shows a perspective view of a piping system in a hold of a ship

FIG. 1 shows a ship 10 for transporting grain is divided by partition walls 12 into a plurality of holds 14 for accommodating grain. At the bottom of the hold 14 is a piping system 16. The piping system 16 is connected to water ballast tans for ballasting the ship during loading.

Figure 2:
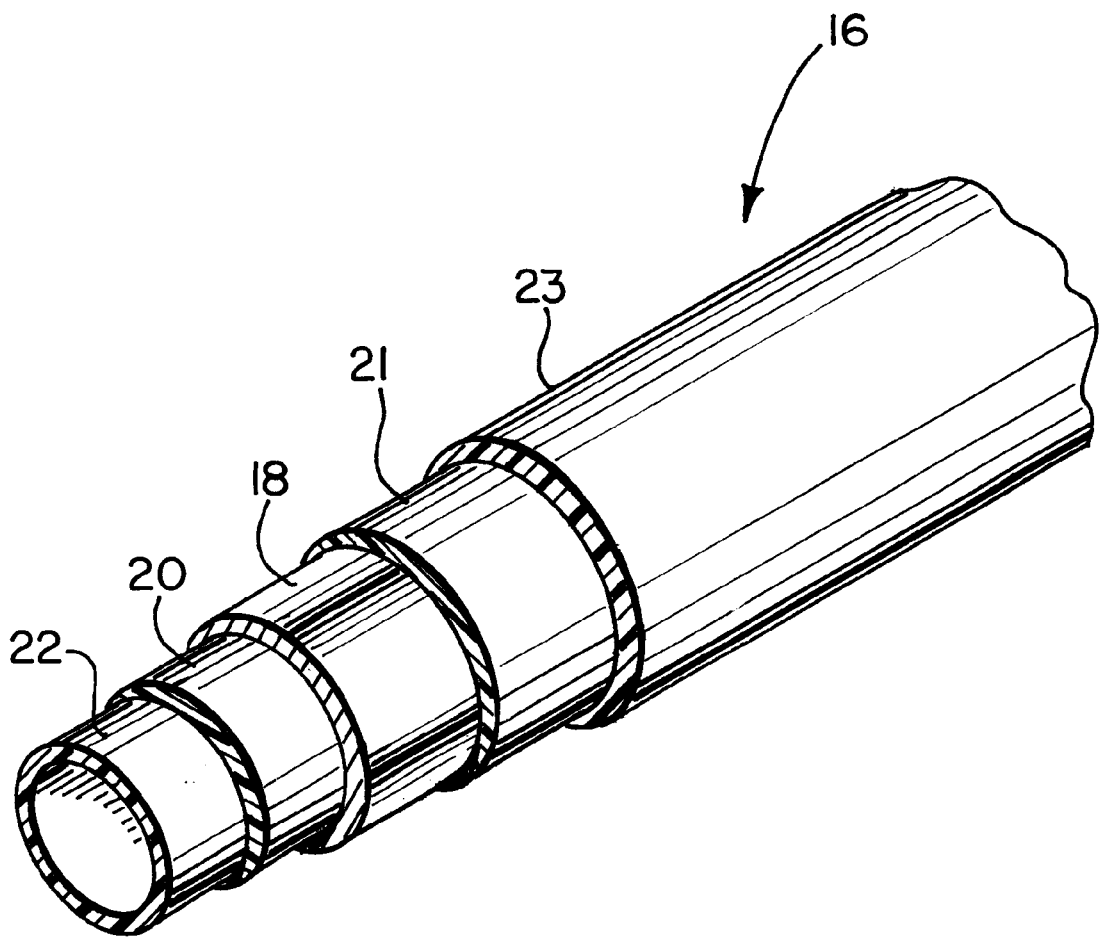
FIG. 2 shows an exploded view of the piping used in the piping system

FIG. 2 shows the detail of the pipe used in the piping system 16. The pipe is preferably made from a tube of aluminum 18 which further has bonding layers 20 and 21, such as a maelic anhydride adhesive disposed on the outer surface. Disposed on the bonding layers 20 and 21 are polymer layers 22 and 23, such as a high density polyethylene copolymer, a propylene/ethylene copolymer or another alpha olefin polymer. The polymer layer can be selected from the group consisting of: polypropylene, polyethylene, polybutylene, copolymers thereof, and blends thereof. It is most preferred to use a high density polymer, which is internally cross-linked, enabling the resultant pipe composite to have high density and be highly resistant to abrasion. A high-density internally cross-linked polyethylene is the most preferred material for use in the present invention. High-density polyethylene is extremely resistant to chemicals, solvents and extreme temperatures, from 40 degrees below 0 degree Fahrenheit, to 40 degrees Fahrenheit and above zero. These characteristics are very desirable and heretofore unknown for ship use. It is also preferred that the polymer or copolymers be at least partially crystalline.

Additional fire resistant additives can be mixed into the polymer, copolymer as well as other stabilizers, which improve the polymer's resistance to degradation. Specifically, the polymer can further include antioxidants, UV stabilizers, fillers and flame resistant materials as well as flame spread reduction agents. Additional components could be added to the polymer prior to blending such as a fluid intumescent base material, an oxygen reduction agent, a thermal transmission reduction agent, a volatile organic reduction component, a mechanical enhancer component for physical impact resistance and adhesion to a substrate, a water-resistance agent, or an elasticity agent to increase resistance to cracking and shrinking and to improve ease of handling. Typical flame spread reduction agents can be aluminum trihydrates, ammonium orthophosphates, zinc oxides, zinc borates, sodium silicates, calcium silicates, antimony oxides, zinc metaphosphate or potassium metaphosphate.

The oxygen reduction agent, which could be used, could be urea, urea formaldehyde or dicynadiamide. The thermal transmission reduction agent could be zirconium oxide, chromium oxide, and yttrium oxide or potassium oxide. The water-resistant agent that could be added can be selected from the group of ethyl hydroxy ethyl cellulose, carboxylmethyl cellulose, ammonium polyphosphate, melamine-formaldehyde coatings, acrylics, silicones, diethylene glycol or monoethyletheracetate. Elasticity agents may include elastomerics or acrylics. Pigments may also be added to the polymer layer.

The additive materials can be used in amounts from 2 to 15% by weight in the polymer or in other amounts, which would be obvious to one skilled in the art of blending polymer components. The selections and combination of additives would depend on the type of application needed.

The metal tube, which is preferably aluminum has the polymer composite extruded or sprayed onto the tube or disposed on the metal is a plurality of layers, or possibly bonded with a bonding resin, such as a maelic anhydride. The polymer is disposed on the inner and outer surfaces of the metal tube.

It is anticipated that the formed multi-layer composite pipe range in size with a nominal diameter from about 10 mm to 63 mm. The pipe composite material preferably is designed to sustain a pressure of up to 210 psi and up to 210 degrees Fahrenheit.

The piping is preferably formed from (a) a metal sheet which is lapped and welded, or (b) bolted and welded prior to coating with the bonding layer, preferably on both sides, and the polymer layer.

The bonding layer may have a maleic anhydride content from 0.05 to 0.5% by weight. In addition to maleic anhydride, the bonding material may be an ethylene-acrylic acid polymer or an ethylene-methacrylic acid copolymer.

Additionally, films may be adhered to the pipe on the exterior to improve durability while maintaining the flexibility of the pipe. If a film is used, it could be a non-crystalline linear polyester having a softening point below 150 degrees centigrade.

Although the invention has been shown and described in terms of a preferred embodiment, thereof it will be clear that many changes and modifications will be obvious to one skilled in the art without departing from the spirit and scope of the invention as defined in the claims.

What is claimed is:

1. A ship including a multi-layer composite piping system formed from a laminated pipe structure comprising:
    (a) a metal tube;
    (b) a bonding layer disposed on both sides of the metal tube; and
    (c) an internally cross-linked polymer layer disposed on both founding layers; wherein said polymer layer is selected from polymers which are members of the group comprising polypropylene, polyethylene, polybutylene, copolymers thereof, and blends thereof wherein said polymer layer is in at least a partially crystalline form.

2. A ship including a multi-layer composite piping system formed from a laminated pipe structure comprising:
    (a) a metal tube;
    (b) a bonding layer disposed on both sides of the metal tube; and
    (c) an internally cross-linked polymer layer disposed on both founding layers; wherein said polymer layer is selected from polymers which are members of the group comprising polypropylene, polyethylene, polybutylene, copolymers thereof, and blends thereof wherein said polymer layer further comprises additives, which can include a member of the group: antioxidants, elasticity agents, water resistant agents, UV stabilizers, fillers, flame resistant materials, and other stabilizers.

3. A ship including a multi-layer composite piping system formed from a laminated pipe structure comprising:
    (a) a metal tube;
    (b) a bonding layer disposed on both sides of the metal tube; and
    (c) an internally cross-linked polymer layer disposed on both founding layers; wherein said polymer layer is selected from polymers which are members of the group comprising polypropylene, polyethylene, polybutylene, copolymers thereof, and blends thereof wherein said polymer layer further includes a pigment.

4. A ship including a multi-layer composite piping system formed from a laminated pipe structure comprising:
    (a) a metal tube;
    (b) a bonding layer disposed on both sides of the metal tube; and
    (c) an internally cross-linked polymer layer disposed on both founding layers; wherein said polymer layer is selected from polymers which are members of the group comprising polypropylene, polyethylene, polybutylene, copolymers thereof, and blends thereof and further comprising a fluid intumescent base material.

* * * * *